(No Model.)

W. H. SMITH.
SAW SET.

No. 572,835. Patented Dec. 8, 1896.

Witnesses
R. H. Newman
Harriet L. Slason

Inventor
WILLIAM H. SMITH

Chamberlain & Newman Attorneys

UNITED STATES PATENT OFFICE.

WILLIAM H. SMITH, OF OAKVILLE, CONNECTICUT.

SAW-SET.

SPECIFICATION forming part of Letters Patent No. 572,835, dated December 8, 1896.

Application filed May 12, 1896. Serial No. 591,223. (No model.)

*To all whom it may concern:*

Be it known that I, WILLIAM H. SMITH, a citizen of the United States, and a resident of Oakville, in the county of Litchfield and State of Connecticut, have invented certain new and useful Improvements in Saw-Sets, of which the following is a specification.

This invention relates to new and useful improvements in saw-sets, and has for its object to provide means for adjusting the saw-guide and also the means for setting the teeth of said saw. I also provide means for operating upon the teeth of a saw, which means operates in a radial manner, thus more directly engaging and following said teeth and bending them against the shoulder of the die, consequently obviating any binding or slipping of the engagement of such teeth as is necessitated by a horizontal plunger movement, such as is common in tools of this class. By the employment of the stationary die in connection with the mechanism shown I avoid the necessity of using complicated means for adjusting said die, which, as will be obvious, materially weakens a tool at this point and thus limits its utility. I further improve upon other details of construction, as will be apparent and later described.

Upon the accompanying drawings, which form a part of this specification, the same numerals of reference denote like or corresponding parts upon the several figures, of which—

Figure 1:
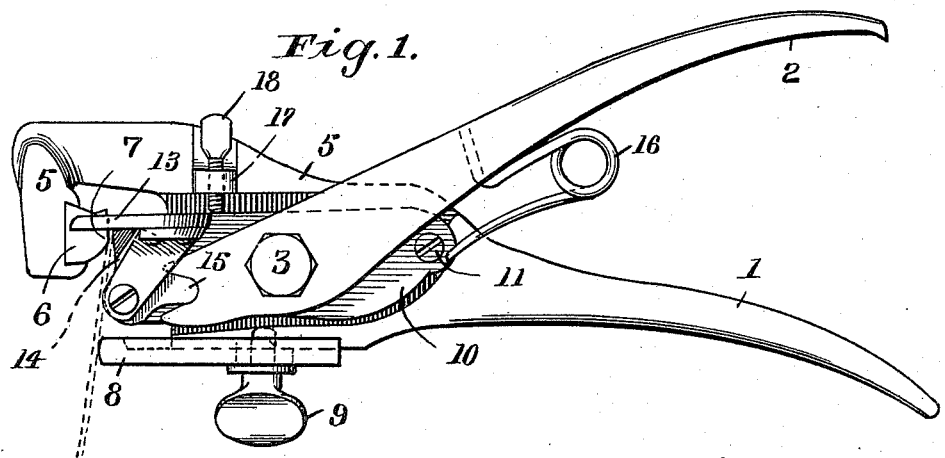
Figure 5:
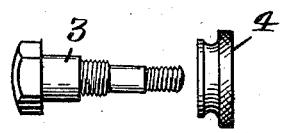
Figure 2:
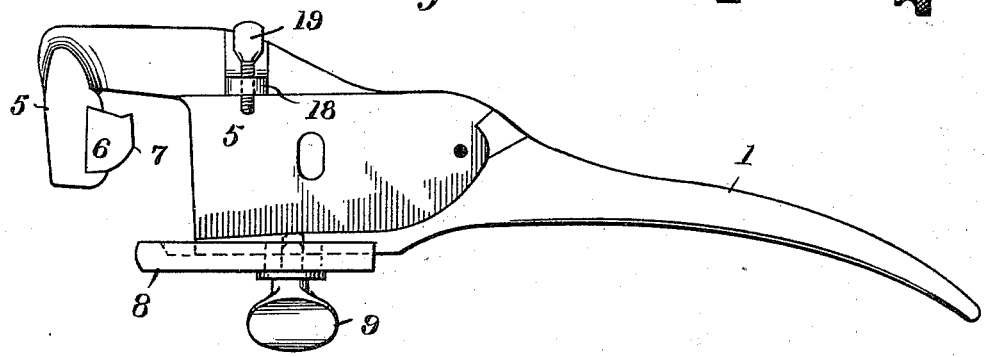
Figure 3:
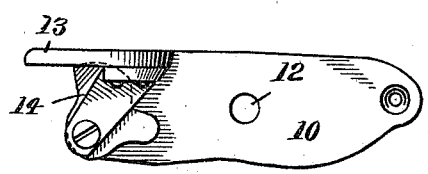
Figure 4:
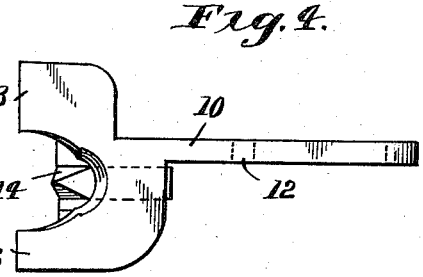

Figure 1 shows a side elevation of my improved saw-set complete. Fig. 2 shows a similar side elevation of the rear jaw of my saw-set as shown in Fig. 1. Fig. 3 is a detail side elevation of the adjustable guide and the means carried thereby for operating upon the teeth of the saw. Fig. 4 is a plan view of the parts shown in Fig. 3. Fig. 5 is a detail of the pivotal screw upon which the operating-jaws of the tool are pivoted.

Referring to the numerals of reference marked upon the drawings, 1 and 2 indicate the two operating-handles of my tool, by means of which the jaws thereof are manipulated.

3 is a pivotal screw which serves to connect said parts together, and 4 is a nut to retain said screw in its proper position. The forward end of the lower handle 1 I will term a "head" and indicate the same by 5. Within suitable dovetails of said head is firmly secured a die-block 6, having a shoulder 7, over which the teeth of the saw are bent and against which the sides of the same are guided while moving said saw to operate upon the successive alternate teeth.

To the under side of the head 5 I secure a guide-plate 8, which is adapted to be adjusted in or out and so held by means of a clamping-screw 9, passing through a slot of said plate and engaging the base of said head. It will thus be apparent that the amount of set given the teeth is governed by means of the position of this guide-plate with relation to the shoulder 7 of the die 6 before mentioned, it being obvious that when said guide-plate is in an extended position the saw is held at more of an angle and the amount of set will be greater than when it is in a retracted position.

Between the pivotal points of the handles 1 and 2 before mentioned is inserted a plate 10, which serves both as a guide for the edge of the teeth to be moved against and also to carry the operating-die which moves against the saw-teeth. This plate is pivotally secured to the head 5 by means of a screw 11, as shown in Fig. 1, and is also provided with a tap 12, which the screw 3 before mentioned engages, and by means of which said plate is clamped in a raised or lowered position. Said intermediate plate 10 is provided upon its forward upper end with a divided angular extension 13, which serves as a guide against which the edge of the saw is shifted. Immediately between said divided extension 13 is pivoted the operating-die 14, having a toggle connection 15 with the forward end of the operating-lever 2, as clearly appears in Fig. 1. Said operating-die is normally held in an open position by means of the spring 16, retained between the handles of the tool.

Immediately above the intermediate plate 10 and to the top of the head 5 is secured a lug 17, in which is fitted an adjusting-screw 18, the point of which engages said plate and serves to limit the upward movement thereof. Said screw is employed in connection with the pivotal screw 3 before mentioned as follows: The nut 4 of said pivotal screw 3 is loosened and the screw 18 adjusted to accommodate the desired position of the intermediate plate, after which the nut 4 is again tightened and said plate thus clamped. From the above it will be seen that the different depths of saw-teeth are accommodated by the varying distances between the under side of the divided extension 13 and the shoulder 7 of the die.

Having thus described my invention, what I claim, and desire to secure by Letters Patent, is—

1. In a tool of the class described, the combination with the head supporting a die, of a plate 10 secured to said head and bearing a guide for the saw, means for adjusting said plate and guide, a movable operating-die pivoted to said plate, and an operating-lever having connections with said die for manipulating the same, substantially as described.

2. The combination in a saw-set, of a head having a stationary die secured therein, a plate pivoted to said head and bearing guides to straddle the die mentioned, screws 3 and 18 for adjusting said plate and guide with relation to the die, a pivoted operating-die supported by said plate and having a toggle connection with an operating-handle, and an adjustable plate 8 secured to the under side of the head, substantially as and for the purposes described.

Signed at Oakville, in the county of Litchfield and State of Connecticut, this 6th day of May, A. D. 1896.

WM. H. SMITH.

Witnesses:
  WM. R. SMITH,
  J. H. SIMON.